(12) United States Patent
Kuo et al.

(10) Patent No.: US 8,219,242 B2
(45) Date of Patent: Jul. 10, 2012

(54) AUTOMATED MATERIAL HANDLING SYSTEM AND METHOD

(75) Inventors: Chia-Cheng Kuo, Yilan County (TW); Yuan-Chung Cheng, Hsinchu County (TW)

(73) Assignee: Powerchip Technology Corporation, Hsinchu (TW)

( * ) Notice: Subject to any disclaimer, the term of this patent is extended or adjusted under 35 U.S.C. 154(b) by 611 days.

(21) Appl. No.: 12/497,092

(22) Filed: Jul. 2, 2009

(65) Prior Publication Data
US 2010/0063620 A1    Mar. 11, 2010

(30) Foreign Application Priority Data
Sep. 5, 2008    (TW) ................................ 97134041 A

(51) Int. Cl.
*G06F 7/00* (2006.01)
(52) U.S. Cl. ...................................... 700/214; 414/277
(58) Field of Classification Search .................... 700/214
See application file for complete search history.

(56) References Cited

U.S. PATENT DOCUMENTS
2009/0035102 A1*    2/2009    Zimmerhackl et al. .. 414/222.04
* cited by examiner

*Primary Examiner* — Gene Crawford
*Assistant Examiner* — Kyle Logan
(74) *Attorney, Agent, or Firm* — Muncy, Geissler, Olds & Lowe, PLLC

(57) ABSTRACT

An automated material handling system for combining overhead conveyer with a material control system is disclosed. First and second virtual stocker codes are respectively assigned to first and second virtual stocker of an over-head conveyer (OHC) using a material control system. A front opening unified pod (FOUP) is moved to and loaded in the first virtual stocker using a transport system controller. The FOUP is loaded in a track of the OHC and assigned a virtual vehicle code. The FOUP is moved, along the track, to the second virtual stocker and loaded in the second virtual stocker, while the virtual vehicle code is being removed, and is removed therefrom using the transport system controller.

21 Claims, 8 Drawing Sheets

AUTOMATED MATERIAL HANDLING SYSTEM AND METHOD

CROSS REFERENCE TO RELATED APPLICATIONS

This Application claims priority of Taiwan Patent Application No. 97134041, filed on Sep. 5, 2008, the entirety of which is incorporated by reference herein.

BACKGROUND OF THE INVENTION

1. Field of the Invention

The invention relates to an automated material handling system, and more particularly to an automated material handling system and method for combining an over-head conveyer with a material control system.

2. Description of the Related Art

With respect to current automated material handling systems (AMHS), a front opening unified pod (FOUP) is transmitted between transport system controllers (TSC) (i.e. semiconductor control devices complying with Semiconductor Equipment and Materials International (SEMI) E82 communication protocol) and can only be transmitted from one transport system controller to another one via stockers. As shown in FIG. 1, a transport system controller 110 must first move a FOUP 200 to a stocker (STK) 400 and a transport system controller 130 can only take the FOUP 200 from the stocker 400.

An arm mechanism (not shown) of the stocker 400 can only transmit a single FOUP or a predetermined number of FOUPs at the same time. Thus, when the transport system controller 110 continuously transmits FOUPs to the stocker 400, excessive loading of the stocker 400 may occur, generating transport bottlenecks which negatively affects transport performance.

Additionally, with respect to current automated transport systems, an over-head conveyer (OHC) is utilized. However, the OHC cannot efficiently control process flow and only provides a connection to a Material Control System (MCS) using a single transport system controller. Further, the automated transport systems do not provide applications for conveyer stocker controllers (CSC).

Thus, an automated material handling system and method for combining an over-head conveyer with a material control system is desirable.

BRIEF SUMMARY OF THE INVENTION

Automated material handling systems are provided. An exemplary embodiment of an automated material handling system for combining an over-head conveyer with a material control system comprises the material control system, a transport system controller, a front opening unified pod (FOUP), and the over-head conveyer. The over-head conveyer further comprises at least a first output/input (I/O) port and a second I/O port. The material control system and the over-head conveyer respectively assign first and second virtual stocker codes to the first and second I/O ports. The transport system controller moves the FOUP to and loads the FOUP in the first I/O port based on the first virtual stocker code. The over-head conveyer loads the FOUP in a track thereof and assigns a virtual vehicle code to the FOUP, and moves the FOUP, along the track based on the virtual vehicle code, to the second I/O port and loads the FOUP in the second I/O port, while the virtual vehicle code is being removed. The transport system controller takes the FOUP away according to the second virtual stocker code using the transport system controller.

Additionally, automated material handling methods are provided. An exemplary embodiment of an automated material handling method comprises the following. First and second virtual stocker codes are respectively assigned to first and second conveyer stocker controllers of an over-head conveyer using a material control system. A front opening unified pod (FOUP) is moved to and loaded in the first conveyer stocker controller based on the first virtual stocker code using a transport system controller. The FOUP is loaded in a track of the over-head conveyer and assigned a virtual vehicle code using the over-head conveyer. The FOUP is moved, along the track, to the second conveyer stocker controller and loaded in the second conveyer stocker controller, the virtual vehicle code is removed, and the FOUP is removed from the second conveyer stocker controller according to the second virtual stocker code using the transport system controller.

Another embodiment of the automated material handling method comprises the following. First and second virtual stocker codes are respectively assigned to first and second conveyer stocker controllers, wherein the first conveyer stocker controller comprises an input/output (I/O) port and a first track and the first track provides plural storage locations. A front opening unified pod (FOUP) is moved to and loaded in the first conveyer stocker controller based on the first virtual stocker code using a transport system controller. The FOUP is transmitted from an input port of the first conveyer stocker controller to an output port thereof using a material control system. The FOUP is loaded from the output port of the first conveyer stocker controller in a second track of an over-head conveyer. A virtual vehicle code is assigned to the FOUP when the FOUP is loaded in the second track. The FOUP is moved, along the second track of the over-head conveyer, to the second conveyer stocker controller and loaded in the FOUP in the second conveyer stocker controller. The virtual vehicle code is removed from the FOUP and the FOUP is removed from the second conveyer stocker controller according to the second virtual stocker code using the transport system controller.

Another embodiment of the automated material handling method comprises the following. A first virtual stocker code is assigned to a first conveyer stocker controller, wherein the first conveyer stocker controller comprises at least a first input/output (I/O) port and a second I/O port and a first track connecting the first I/O port to the second I/O port, providing plural storage locations. A front opening unified pod (FOUP) is moved to and loaded in the first I/O port of the first conveyer stocker controller based on the first virtual stocker code using a transport system controller, wherein the first I/O port serves as an input port of the first conveyer stocker controller. The FOUP is transmitted from the first I/O port of the first conveyer stocker controller to the second I/O port thereof using a material control system, wherein the second I/O port serves as an output port of the first conveyer stocker controller. The FOUP is removed from the second I/O port of the second conveyer stocker controller using the transport system controller.

Another embodiment of the automated material handling method comprises the following. A first virtual stocker code is assigned to a first conveyer stocker controller, wherein the first conveyer stocker controller comprises at least a first input/output (I/O) port and a second I/O port and a first track connecting the first I/O port to the second I/O port, providing plural storage locations. A front opening unified pod (FOUP) is moved to and loaded in the first or second I/O port of the first conveyer stocker controller based on the first virtual stocker code using a transport system controller. The FOUP is removed from the first or second I/O port of the first conveyer stocker controller using the transport system controller and moved to and loaded in a second conveyer stocker controller, wherein the second conveyer stocker controller comprises a second virtual stocker code and provides at least a third I/O port, and wherein a second track connecting the third I/O port and the second track provides plural storage locations.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
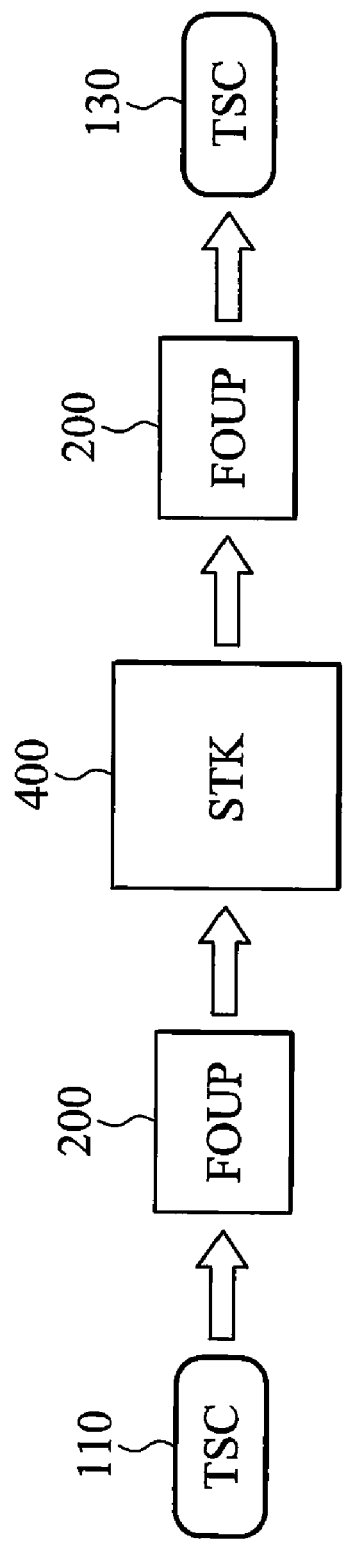
FIG. 1 is a schematic view of a conventional automated material handling system.

Several exemplary embodiments of the invention are described with reference to FIGS. 2 through 6, which generally relate to an automated material handling system. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses an automated material handling system and method for combining an over-head conveyer with a material control system.

Figure 2:
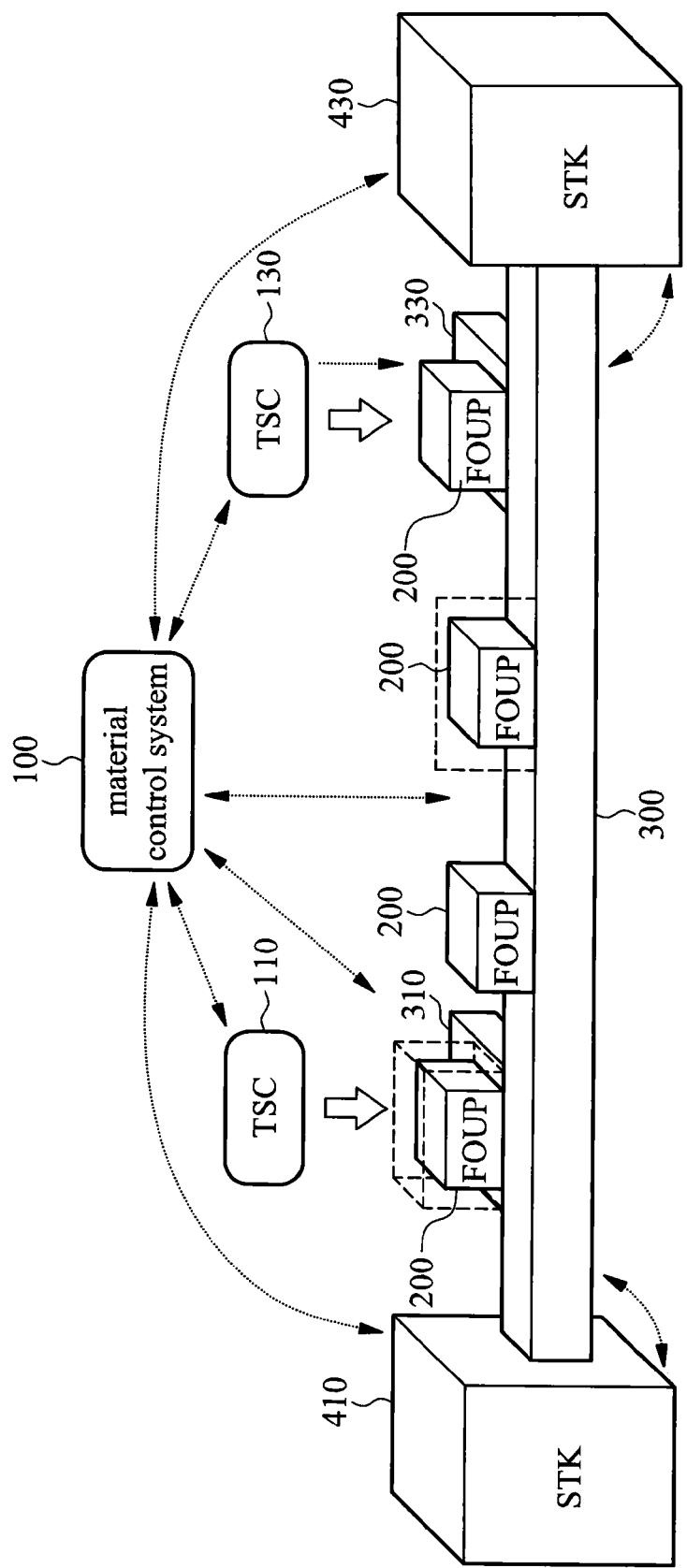
FIG. 2 is a schematic view of an automated material handling system of the present invention.

FIG. 2 is a schematic view of an automated material handling system of the present invention.

An embodiment of the automated material handling system at least comprises a material control system 100, transport system controllers 110 and 130 managed by the material control system 100, a FOUP 200, an over-head conveyer 300, and stockers (STK) 410 and 430. The over-head conveyer 300 comprises input/output (I/O) ports 310 and 330 or multiple I/O ports.

In an embodiment, any one of the I/O ports (the I/O port 310 or 330, for example) of the over-head conveyer 300 is defined as a virtual stocker (named a conveyer stocker controller for the automated material handling system as well) for storing the FOUP 200. Additionally, a FOUP (the FOUP 200, for example) transmitted by the over-head conveyer 300 is defined as a virtual vehicle which is directed to transmit during wafer fabrication (i.e. between the I/O ports 310 and 330 or between the stockers 410 and 430) or between two transport system controllers (i.e., between the transport system controllers 110 and 130) without using the physical stockers (i.e. the stockers 410 and 430).

Note that the I/O port 310 or 330 indicate a start port, an end port, any one of ports (including branch ports) residing in a transport path or an I/O port group composed of multiple I/O ports.

A conveyer stocker controller connects to the material control system 100 using a SEMI E88 communication protocol and to other automated material handling systems (the material control systems 100 and 130, for example) using a SEMI E88 communication protocol.

A FOUP (the FOUP 200, for example) transmitted by the over-head conveyer 300 is assigned a virtual vehicle code, VVCabc, for example, where a and b are ranged from 0 to X and c is ranged from 1 to X, and X is a positive integer, therefore represented by VVC001, VVC002, VVC003, and so forth. Additionally, any one of the ports (the I/O port 310 or 330, for example) of the over-head conveyer 300 is assigned a virtual stocker code, VSCabc, for example, where a and b are ranged from 0 to X and c is ranged from 1 to X, and X is a positive integer, therefore represented by VSC001, VSC002, VSC003, and so forth.

The transport system controller 110 or 130 can be managed by the same material control system (the material control system 100, for example) or different material control systems (the material control system 100 and another one, for example). In this embodiment, the transport system controller 110 or 130 is managed by the same transport system controller. In another embodiment, the transport system controller 110 or 130 is managed by different transport system controllers using the same control flow, which is not further described herein. Further, the automated material handling system can use only a single transport system controller (the transport system controller 110 or 130, for example) to perform a material handling process.

Definitions and operations of the described components of the automated material handling system are described in the following. Further, note that an I/O port of the over-head conveyer is a hardware structure, but a material control system is indicated by a virtual stocker and an automated material handling system is indicated by a conveyer stocker controller. Thus, in this embodiment, an I/O port, a virtual stocker, and a conveyer stocker controller are respectively directed to the same component and provided by different terms due to corresponding applications.

Based on the definitions by the material control system 100 and the over-head conveyer 300, virtual stocker codes (VSC001 and VSC002, for example) are respectively assigned to the I/O ports 310 and 330. When the FOUP 200 is directed to be moved to the I/O port 330 using the over-head conveyer 300, the I/O ports 310 and 330 respectively serve as a stocker.

The FOUP 200 is moved to the I/O port 310 using the transport system controller 110. When the FOUP 200 is loaded in the I/O port 310 which serves as a stocker, the FOUP 200 resides in the I/O port 310. When the FOUP 200 is loaded, from the I/O port 310, in a track of the over-head conveyer 300, a virtual vehicle code (VVC001, for example) is assigned to the FOUP 200 which serves as a transport vehicle. The FOUP 200, serving as a transport vehicle, moves along the track of the over-head conveyer 300 and is loaded in the I/O port 330 serving as a stocker, wherein when the virtual vehicle code is being removed from the FOUP 200 using the over-head conveyer 300, the FOUP 200 does not further serve as a transport vehicle. At this time, the FOUP 200 resides in the I/O port 330 which serves as a conveyer stocker controller and is removed from the I/O port 330 using the transport system controller 130.

Note that the described embodiment is implemented using two transport system controllers (110 and 130) but is not to be limitative. Only one transport system controller can also be used to implement the described process. Additionally, a Rail Guided Vehicle (RGV), an overhead hoist Transport (OHT), an Overhead Hoist Shuttle (OHS) or any tools or equipments capable of automatically moving the FOUP 200 can be used to replace the transport system controller.

Note that the FOUP 200 can also be transmitted to the stocker 410 or 430 via the over-head conveyer 300, resulting in flexible management. Additionally, the transport system controller 110 moves the FOUP 200 to and loads the FOUP 200 in the I/O port 310 and the FOUP 200 can be directly removed from the I/O port 310.

Note that the FOUP 200 can also be moved to the I/O port 330 using the transport system controller 130, be transmitted to the I/O port 310 via the over-head conveyer 300, and be removed using the transport system controller 110, achieving bidirectional transport.

Note that the virtual vehicle codes and the virtual stocker codes can be managed or defined by users or administrators or predefined to dynamically determine an allocated number of virtual stockers, an applicable number of transport vehicles leaving from each I/O ports (i.e. virtual stockers) of the over-head conveyer 300, and the amount of virtual vehicles carried by the over-head conveyer 300. If the over-head conveyer 300 comprises two I/O ports (the I/O ports 310 and 330, for example) and a track thereof can carry 10 transport vehicles (VVC001~VVC010, for example), when the number of the transport vehicles carried by the over-head conveyer 300 reaches 10, other transport vehicles (VVC011 and VVC012, for example) must respectively await at the I/O ports 310 and 330. Further, if the number of transportable transport vehicles for the I/O ports 310 and 330 at the same time is respectively identical to 6 (VVC001~VVC006 and VVC007~VVC012, for example) and the number is reached or the number of the transport vehicles carried by the over-head conveyer 300 reaches 10, other FOUPs which serve as transport vehicles can be loaded in the over-head conveyer 300 from the I/O port 310 or 330 and would be assigned virtual vehicle codes only if existing FOUPs leave the track of the over-head conveyer 300.

Figure 3A:
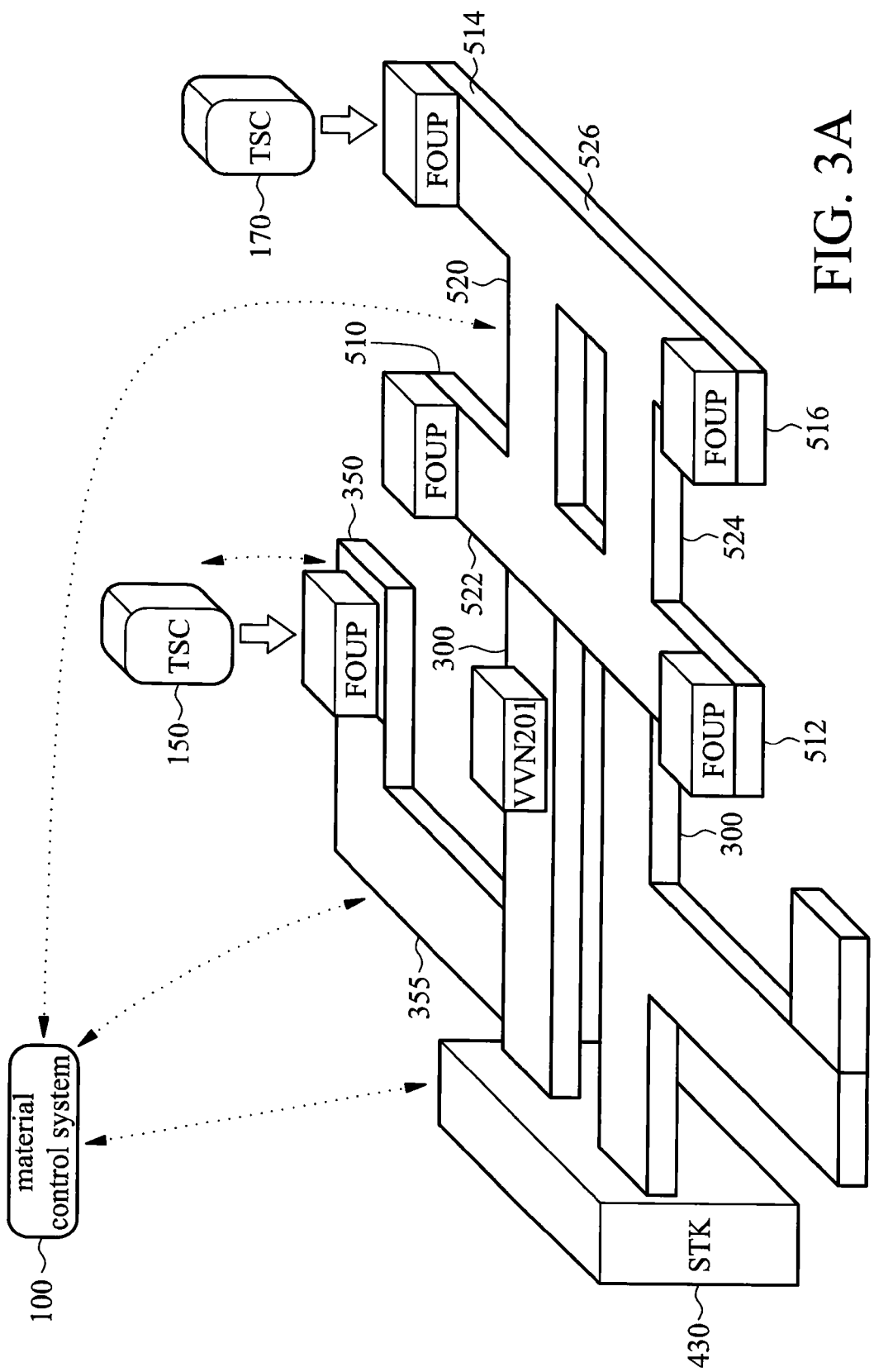
FIGS. 3A-3C are schematic views of an automated material handling system with two tracks.
Figure 3B:
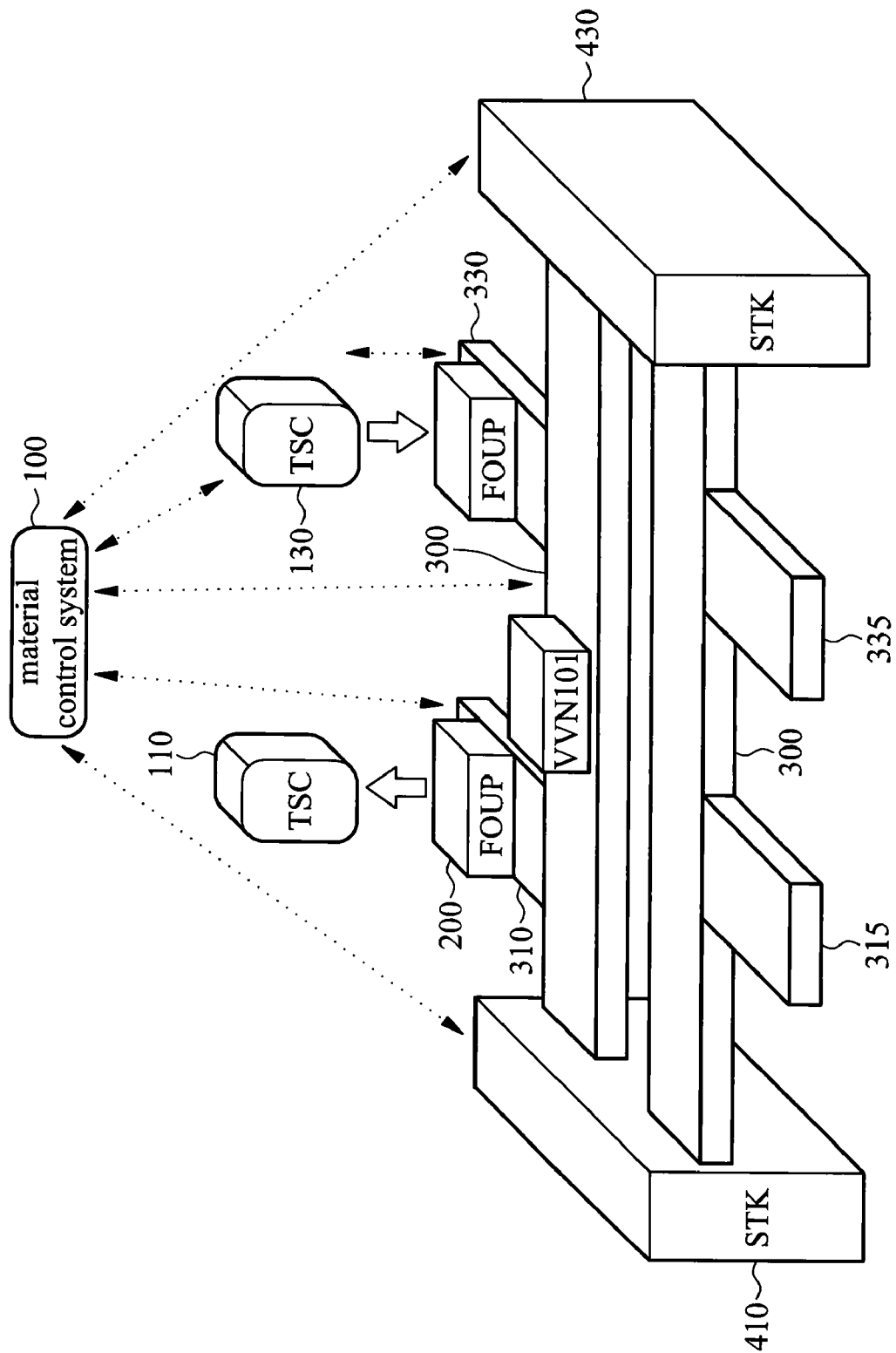
Figure 3C:
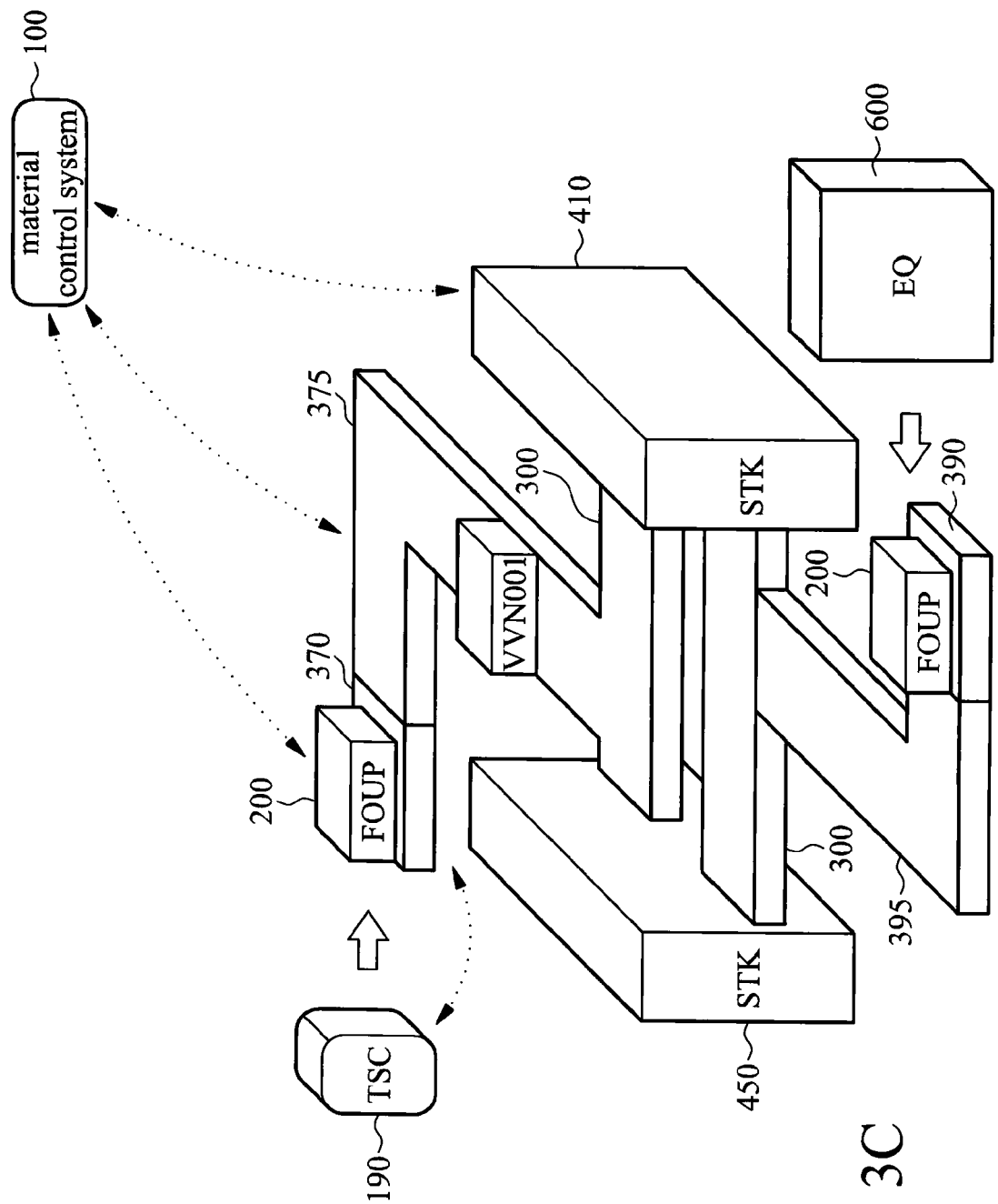

FIG. 2 is a schematic view of an automated material handling system with a single track, which is not to be limitative. The automated material handling system can also be implemented using two tracks, three tracks or more than three tracks. FIGS. 3A-3C are schematic views of an automated material handling system with two tracks. Referring to FIG. 3A, an I/O port 350 and a track 355, connecting the I/O port 350 to the over-head conveyer 300, are defined as a virtual stocker and are respectively assigned a virtual stocker code, VSCPabc and VSCTabc, for example, where the VSCPabc indicates a virtual stocker code for the I/O port and the VSCTabc indicates a virtual stocker code for the track. a and b are ranged from 0 to X and c is ranged from 1 to X, and X is a positive integer, therefore represented by VSCP001, VSCP002, ..., and VSCT001, VSCT002, ..., and so forth. Thus, the I/O port 350 and the track 355 can be used to store FOUPs, wherein the number thereof to be stored is preset. Note that the definition of the virtual stocker codes is only an example but is not to be limitative.

If the virtual stocker composed of the I/O port 350 and the track 355, for example, is determined to store 5 FOUPs (the track 355 provides 4 storage locations), when a FOUP (the first FOUP, for example) has been located in the I/O port 350 and another FOUP (the second FOUP, for example) is moved to the I/O port 350 using the transport system controller 150, the over-head conveyer 300 loads the first FOUP, from the I/O port 350, in one of the storage locations (the first storage location, for example) of the track 355 and the second FOUP is located in the I/O port 350. When another FOUP (the third FOUP, for example) is moved to the I/O port 350 using the transport system controller 150, the over-head conveyer 300 transmits the first FOUP to the next storage location (the second storage location, for example) of the track 355 and loads the second FOUP in the first storage location of the track 355 and the third FOUP is located in the I/O port 350, and so forth. The I/O port 350 sequentially loads the FOUPs in the track of the over-head conveyer 300 when commands from the over-head conveyer 300 are received.

Note that FOUPs can be randomly located in the storage locations provided by the I/O port 350 and the track 355, when the I/O port 350 and the track 355 are defined as a virtual stocker, and existing FOUPs can be randomly moved among the storage locations of the I/O port 350 and the track 355.

Additionally, as described, a combination of one or multiple I/O ports of the over-head conveyer 300 is defined as a virtual stocker (i.e. a conveyer stocker controller) to be a platform between an over-head conveyer and other transport system controllers and between transport system controllers. Referring to FIG. 3A, the transport system controller 100 defines I/O ports 510, 512, 514, and 516 and tracks 520, 522, 524, and 526 connecting the I/O ports to each other as a virtual stocker and respectively assigns virtual stocker group codes, VSGCPabc and VSGCTabc, for example, wherein VSGC-Pabc indicates a virtual stocker code for the I/O port and the VSGCTabc indicates a virtual stocker code for the track. a and b are ranged from 0 to X and c is ranged from 1 to X, and X is a positive integer, therefore represented by VSGCP001, VSGCP002, ..., and VSGCT001, VSGCT002, ..., and so forth. Thus, the I/O ports 510, 512, 514, and 516 and the tracks 520, 522, 524, and 526 can be used to locate a preset number of FOUPs.

If the tracks 520, 522, 524, and 526, for example, can respectively store 4 FOUPs (i.e. 4 storage locations), when a FOUP (the first FOUP, for example) has been located in the I/O port 510 and the transport system controller 170 moves another FOUP (the second FOUP, for example) to the I/O port 510, the over-head conveyer 300 loads the first FOUP, from the I/O port 520, to one of the storage locations (the first storage location, for example) of the track 520 and the second FOUP is located in the I/O port 510. When the transport system controller 170 moves another FOUP (the third FOUP, for example) to the I/O port 510, the over-head conveyer 300 transmits the first FOUP to the next storage location (the second storage location, for example) of the track 520 and loads the second FOUP in the first storage location of the track 520 and the third FOUP is located in the I/O port 510, and so forth. The I/O port 510 sequentially loads the FOUPs in the track of the over-head conveyer 300, when commands from the over-head conveyer 300 are received, that the FOUPs serve as transport vehicles for transportation. Storage processes for the I/O port 522, 524, and 526 and the tracks 522, 524, and 526 are identical to the previously described process.

As described, the I/O ports 510, 512, 514, and 516 and the tracks 520, 522, 524, and 526 serve as a large-scale virtual stocker, wherein FOUPs can be randomly located in the storage locations provided by the I/O ports 510, 512, 514, and 516 and the tracks 520, 522, 524, and 526, when the I/O port 350 and the track 355 are defined as a virtual stocker, and existing FOUPs can be randomly moved among the storage locations. When one of the FOUPs is loaded in the over-head conveyer 300, the FOUP serves as a virtual vehicle to be transmitted to other I/O ports or stockers via the over-head conveyer 300.

As shown in FIGS. 3A-3C, a FOUP can be directly moved between the I/O ports 310, 330, 350, and 370 and the I/O ports 510, 512, 514, and 516 using the transport system controllers 110, 130, 150, 170, and 190. Additionally, in this embodiment, four I/O ports (310, 330, 350, and 370) are defined as a virtual stocker but are not to be limitative, wherein at least two I/O ports can be defined as a virtual stocker. Further, configuration of the tracks between the I/O ports is not limited to the rectangular configuration and can also be applied to other configurations or irregular configurations.

FIG. 3B provides a system structure similar to that of FIG. 2, wherein difference therebetween is that the system structure of FIG. 3B comprises a two-track application. The processing flow of FIG. 3B is equivalent to that of FIG. 2. Additionally, referring to FIG. 3C, the FOUP 200 can be moved between an equipment 600 and an I/O port 390 using a transport system controller while the equipment 600 may be a tool, an equipment or a semiconductor component in a semiconductor fabrication process.

Note that multiple transport system controllers (110, 130, 150, 170, and 190) are applied herein for detailed description and only a transport system controller is required for implementation. Additionally, referring to FIG. 3C, a transport system controller, a Rail Guided Vehicle (RGV), an Overhead Hoist Transport (OHT), an Overhead Hoist Shuttle (OHS) or any tools or equipments capable of automatically moving FOUPs can be used to move FOUPs between the I/O ports of the virtual stockers and the tracks.

Note that the FOUPs can be directly moved, using the transport system controller 150 or 170, between the first conveyer stocker controller composed of the I/O port 350 and the track 355 and the second conveyer stocker controller composed of the I/O ports 510, 512, 514, and 516 and the tracks 520, 522, 524, and 526. The transport system controller 150 or 170 takes the FOUP away from the output port (one of the storage locations of the track 355, for example) of the first conveyer stocker controller and locates the FOUP in the input port (the I/O port 510, 512, 514, or 516) of the second conveyer stocker controller. Further, the transport system controller 150 or 170 takes the FOUP away from the output port (the I/O port 510, 512, 514, or 516 or one of the storage locations provided by the tracks 520, 522, 524, and 526) of the second conveyer stocker controller and locates the FOUP in the input port (the I/O port 350, for example) of the first conveyer stocker controller.

Note that the I/O port 510, 512, 514, or 516 can be used to be the input or output port of the second conveyer stocker controller. When the FOUP is loaded in the I/O port 510, for example, the I/O port serves as the input port of the second conveyer stocker controller, and, when the FOUP is removed from the I/O port 516, the I/O port 516 serves as the output port of the second conveyer stocker controller. Additionally, the tracks 355, 520, 522, 524, and 526 are used for storing FOUPs and the number of storage locations of each track is determined based on the track length thereof.

Figure 4:
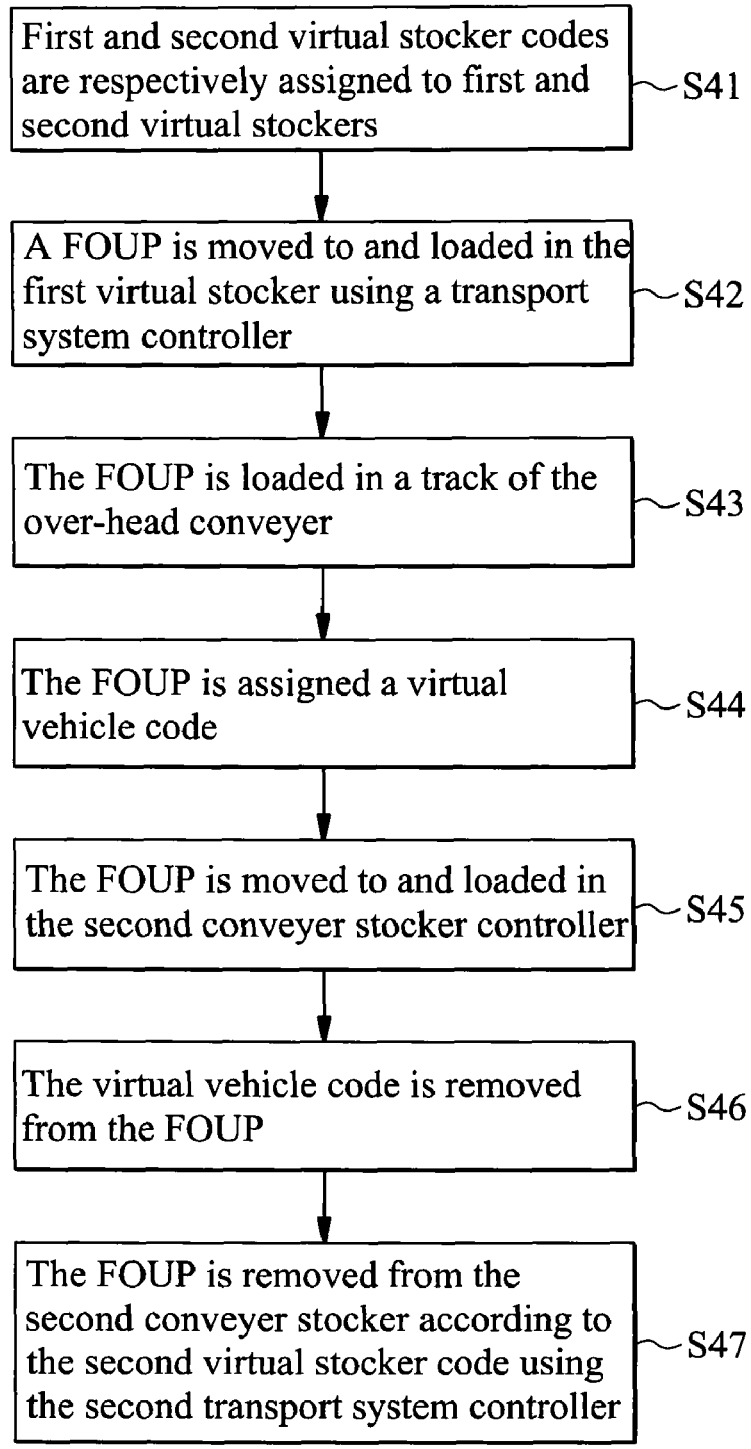
FIG. 4 is a flowchart of a first embodiment of an automated material handling method of the present invention.

FIG. 4 is a flowchart of a first embodiment of an automated material handling method of the present invention.

To begin, first and second virtual stocker codes (VSC001 and VSC002, for example) are respectively assigned to first and second virtual stockers (the I/O ports 310 and 330 as shown in FIG. 2) of an over-head conveyer using a material control system and the over-head conveyer (step S41). A front opening unified pod (FOUP) is moved to and loaded in the first virtual stocker based on the first virtual stocker code using a transport system controller (step S42).

The FOUP is loaded in a track of the over-head conveyer (step S43) and assigned a virtual vehicle code (VVC001, for example) using the over-head conveyer (step S44) so that the FOUP serves as a transport vehicle. The FOUP is moved, along the track, to the second conveyer stocker controller and loaded in the second conveyer stocker controller using the over-head conveyer (step S45), wherein when the virtual vehicle code is being removed therefrom (step S46), the FOUP does not serve as the transport vehicle and is removed from the second conveyer stocker according to the second virtual stocker code using the second transport system controller (step S47).

Figure 5:
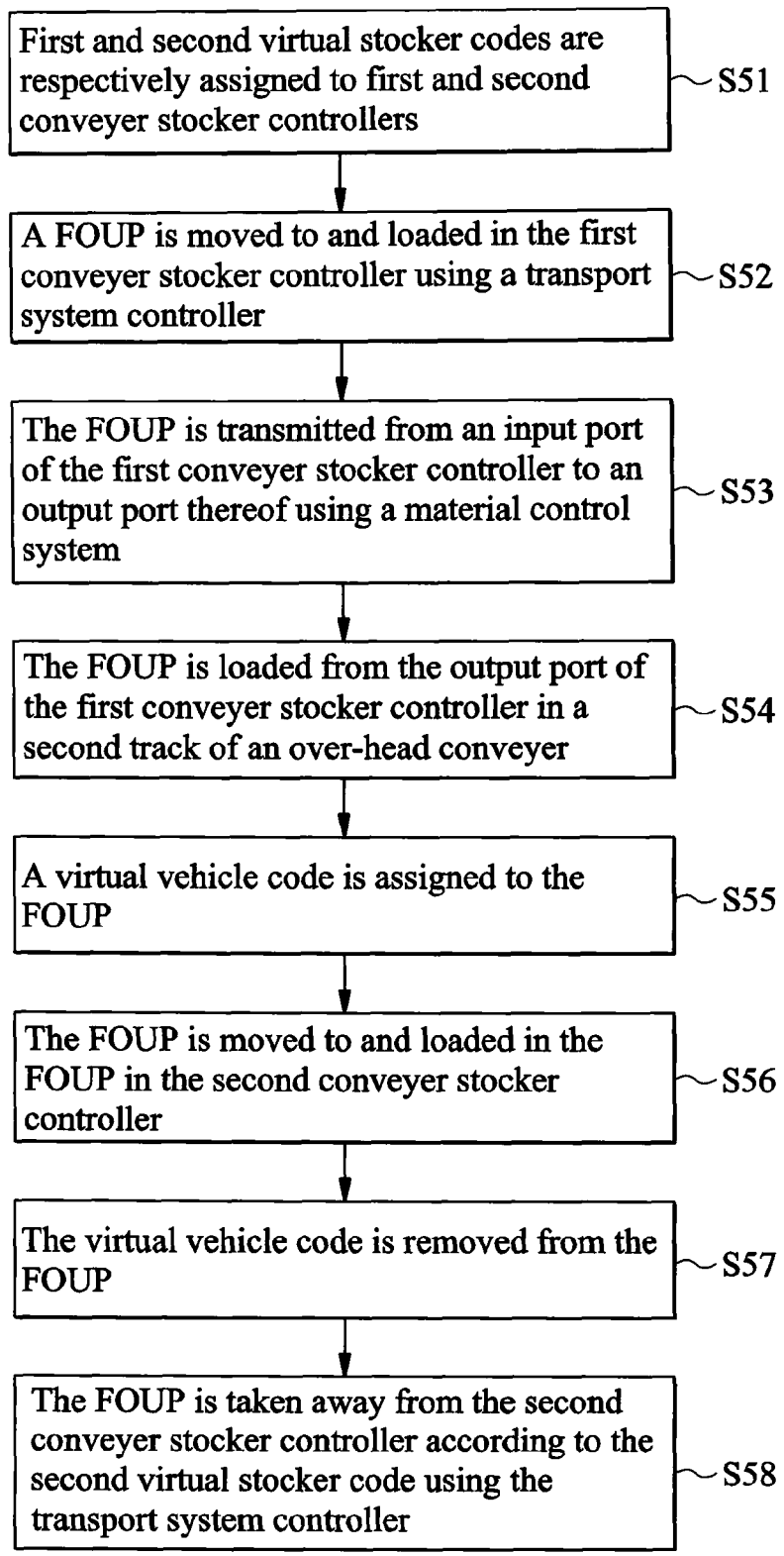
FIG. 5 is a flowchart of a second embodiment of an automated material handling method of the present invention.

FIG. 5 is a flowchart of a second embodiment of an automated material handling method of the present invention.

To begin, first and second virtual stocker codes are respectively assigned to first and second conveyer stocker controllers (step S51), wherein the first conveyer stocker controller comprises an input/output (I/O) port and a first track (the I/O port 350 and the track 355 as shown in FIG. 3A, for example) and the first track provides plural storage locations. Note that the first conveyer stocker controller serves as a virtual stocker herein so that a FOUP can be randomly moved therein without using a material control system. A FOUP is moved to and loaded in the first conveyer stocker controller based on the first virtual stocker code using a transport system controller (the transport system controller 150 as shown in FIG. 3A, for example) (step S52).

The FOUP is transmitted from an input port of the first conveyer stocker controller to an output port thereof (or one of the storage locations of the first track) using a material control system (step S53), indicating the FOUP is transmitted from the input port of the first conveyer stocker controller to the output port of the first track (or one of the storage locations of the first track) via the first track. The FOUP is loaded from the output port of the first conveyer stocker controller in a second track of an over-head conveyer (step S54).

A virtual vehicle code is assigned to the FOUP when the FOUP is loaded in the second track (step S55). The FOUP is moved, along the second track of the over-head conveyer, to and loaded in the second conveyer stocker controller (step S56). The virtual vehicle code is removed from the FOUP (step S57) and the FOUP is removed from the second conveyer stocker controller according to the second virtual stocker code using the transport system controller (step S58).

Figure 6:
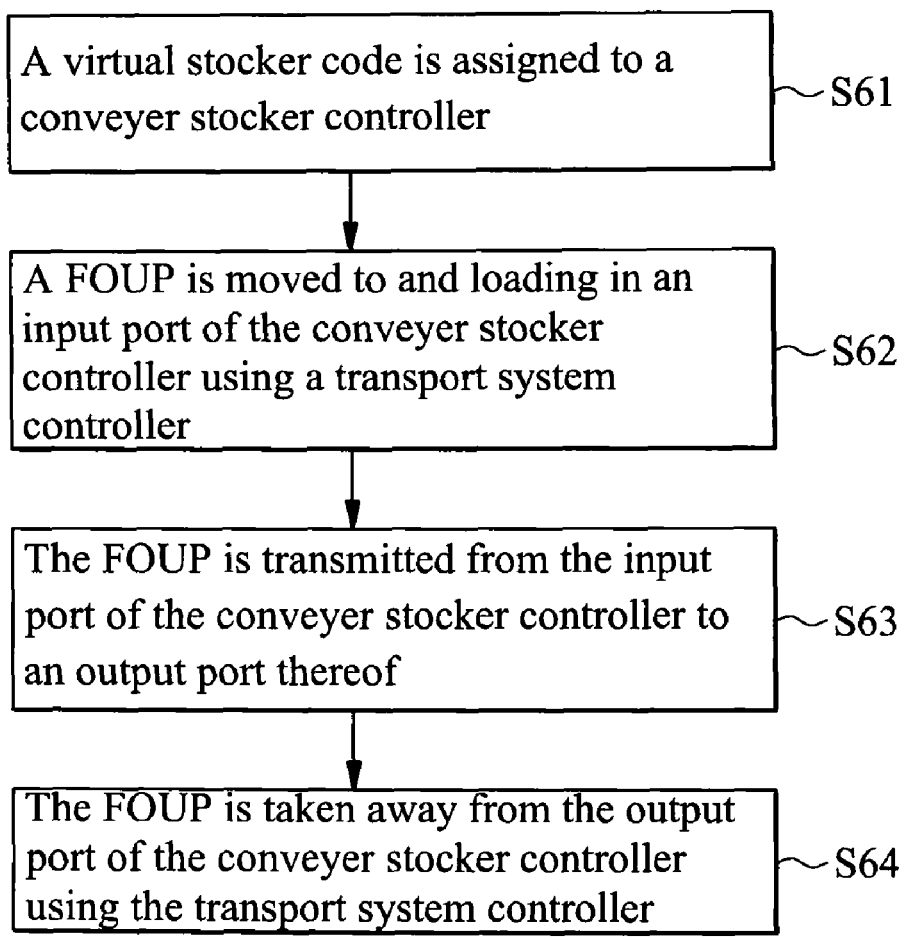
FIG. 6 is a flowchart of a third embodiment of an automated material handling method of the present invention.

FIG. 6 is a flowchart of a third embodiment of an automated material handling method of the present invention.

A virtual stocker code is assigned to a conveyer stocker controller, wherein the conveyer stocker controller comprises first, second, third, and fourth I/O ports (the I/O ports 510, 512, 514, and 516 as shown in FIG. 3A, for example) and first, second, third, and fourth tracks (the tracks 520, 522, 524, and 526 as shown in FIG. 3A, for example) connecting the first, second, third, and fourth I/O ports and each of the tracks provides plural storage locations (step S61). Note that the conveyer stocker controller serves as a virtual stocker herein so that a FOUP can be randomly moved therein without using a material control system.

A FOUP is moved to and loaded in an input port (the I/O port 510 as shown in FIG. 3A, for example) of the conveyer stocker controller based on the first virtual stocker code using a transport system controller (the transport system controller 510 as shown in FIG. 3A, for example) (step S62). The FOUP is transmitted from the input port of the conveyer stocker controller to an output port (the I/O port 512 as shown in FIG. 3A, for example, or one of the storage locations of the first, second, third, and fourth tracks) thereof, which indicate that the FOUP has been transmitted from the input port of the conveyer stocker controller to the output port (or one of the storage locations of the first track) via the first track (step S63).

Note that the number of the input and output ports of the conveyer stocker controller is user-defined or preset. In this embodiment, for example, the conveyer stocker controller may comprise an input port and three output ports or two input ports and two output ports.

The FOUP is removed from the output port of the conveyer stocker controller using the transport system controller, or transmitted from one of the storage locations of the first track to the output port via the first track and removed from the output port using the transport system controller (step S64).

Note that the automated material handling method shown in FIG. 6 is similar to that shown in FIG. 5, such that the FOUP is loaded in the track of the over-head conveyer via the virtual stocker and then loaded in another conveyer stocker controller, which is not further described herein.

As described, an embodiment of the automated material handling method and system for combining an over-head conveyer with a material control system enable the over-head conveyer to comply with the SEMI E84 and E88 communication protocols such that the over-head conveyer and the virtual stocker (the conveyer stocker controller) can connect to existing material control systems to be managed to perform transport commands from the material control systems. Further, the transport quality of the over-head conveyer can be maintained based on the number of transport vehicles.

Software design of the invention can be integrated in the over-head conveyer and existing material control systems of the semiconductor fabrication process, which is convenient for management and control. Additionally, with respect to the structure of the over-head conveyer, rapid control transfer between the transport system controllers can be achieved based on concept of virtual stockers (i.e. conveyer stocker controllers) and virtual vehicles, saving considerable transport time.

The virtual stocker concept allows virtual and physical stockers to provide control of shipping flows and does not occupy a physical footprint of the semiconductor fabrication process. The virtual vehicle concept allows FOUPs to serves as transport vehicles for dynamically planning moving paths so that the over-head conveyer provides flow management to achieve dynamic transport and load balance.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An automated material handling system for combining an over-head conveyer with a material control system, comprising:
    the material control system;
    a transport system controller;
    a front opening unified pod (FOUP); and
    the over-head conveyer, further comprising at least a first output/input (I/O) port and a second I/O port,
    wherein the material control system and the over-head conveyer respectively assign first and second virtual stocker codes to the first and second I/O ports, the transport system controller moves the FOUP to and loads the FOUP in the first I/O port based on the first virtual stocker code, the over-head conveyer loads the FOUP in a track thereof and assigns a virtual vehicle code to the FOUP, and moves the FOUP, along the track based on the virtual vehicle code, to the second I/O port and loads the FOUP in the second I/O port, while the virtual vehicle code is being removed, and the transport system controller takes the FOUP away according to the second virtual stocker code using the transport system controller.

2. The automated material handling system as claimed in claim 1, wherein the first and second I/O ports respectively serve as stockers when the first and second virtual stocker codes are respectively assigned thereto.

3. The automated material handling system as claimed in claim 1, wherein the FOUP serves as a transport vehicle when the virtual vehicle code is assigned thereto.

4. The automated material handling system as claimed in claim 3, wherein the FOUP does not serve as the transport vehicle when the virtual vehicle code is removed therefrom.

5. The automated material handling system as claimed in claim 1, wherein one or multiple I/O ports of the over-head conveyer are defined as a conveyer stocker controller.

6. The automated material handling system as claimed in claim 5, wherein the transport system controller moves and loads the FOUP in one of the I/O ports and then directly takes the FOUP from the loaded I/O port.

7. The automated material handling system as claimed in claim 1, wherein the transport system controller is controlled by the material control system or different material control systems.

8. The automated material handling system as claimed in claim 1, wherein the over-head conveyer moves the FOUP, along the track, to a physical stocker and loads the FOUP in the physical stocker.

9. An automated material handling method, comprising:
    respectively assigning first and second virtual stocker codes to first and second conveyer stocker controllers of an over-head conveyer using a material control system;
    moving a front opening unified pod (FOUP) to and loading the FOUP in the first conveyer stocker controller based on the first virtual stocker code using a transport system controller;
    loading the FOUP in a track of the over-head conveyer and assigning a virtual vehicle code to the FOUP using the over-head conveyer;

moving the FOUP, along the track, to the second conveyer stocker controller and loading the FOUP in the second conveyer stocker controller;

removing the virtual vehicle code; and taking away the FOUP therefrom according to the second virtual stocker code using the transport system controller.

10. The automated material handling method as claimed in claim 9, wherein the first and second conveyer stocker controllers respectively serve as stockers when the first and second virtual stocker codes are respectively assigned thereto.

11. The automated material handling method as claimed in claim 9, wherein the FOUP serves as a transport vehicle when the virtual vehicle code is assigned thereto.

12. The automated material handling method as claimed in claim 11, wherein the FOUP does not serve as the transport vehicle when the virtual vehicle code is removed therefrom.

13. The automated material handling method as claimed in claim 9, wherein the transport system controller moves the FOUP to and loads the FOUP in the first or second conveyer stocker controllers and then directly takes the FOUP from the loaded conveyer stocker controller.

14. An automated material handling method, comprising:

respectively assigning first and second virtual stocker codes to first and second conveyer stocker controllers, wherein the first conveyer stocker controller comprises an input/output (I/O) port and a first track and the first track provides plural storage locations;

moving a front opening unified pod (FOUP) to and loading the FOUP in the first conveyer stocker controller based on the first virtual stocker code using a transport system controller;

transmitting the FOUP from an input port of the first conveyer stocker controller to an output port thereof using a material control system;

loading the FOUP from the output port of the first conveyer stocker controller in a second track of an over-head conveyer;

assigning a virtual vehicle code to the FOUP when the FOUP is loaded in the second track;

moving the FOUP, along the second track of the over-head conveyer, to the second conveyer stocker controller and loading the FOUP in the second conveyer stocker controller;

removing the virtual vehicle code from the FOUP; and taking the FOUP away from the second conveyer stocker controller according to the second virtual stocker code using the transport system controller.

15. The automated material handling method as claimed in claim 14, wherein the FOUP is transmitted from the input port of the first conveyer stocker controller to one of the storage locations of the first track using the material control system.

16. The automated material handling method as claimed in claim 15, wherein the FOUP is moved from the storage location of the first track to the output port and loaded in the second track of the over-head conveyer.

17. The automated material handling method as claimed in claim 14, wherein the FOUP is removed from the output port of the first conveyer stocker controller and moved to and loaded in a third conveyer stocker controller, wherein the third conveyer stocker controller comprises a third virtual stocker code and provides at least first and second I/O ports and a third track connecting the first I/O port to the second I/O port and the third track provides plural storage locations.

18. An automated material handling method, comprising:

assigning a first virtual stocker code to a first conveyer stocker controller, wherein the first conveyer stocker controller comprises at least a first input/output (I/O) port and a second I/O port and a first track connecting the first I/O port to the second I/O port and providing plural storage locations;

moving a front opening unified pod (FOUP) to and loading the FOUP in the first I/O port of the first conveyer stocker controller based on the first virtual stocker code using a transport system controller, wherein the first I/O port serves as an input port of the first conveyer stocker controller;

transmitting the FOUP from the first I/O port of the first conveyer stocker controller to the second I/O port thereof using a material control system, wherein the second I/O port serves as an output port of the first conveyer stocker controller; and taking the FOUP away from the second I/O port of the second conveyer stocker controller using the transport system controller.

19. The automated material handling method as claimed in claim 18, wherein the FOUP is transmitted from the first input port to one of the storage location of the first track using the material control system via the first conveyer stocker controller.

20. The automated material handling method as claimed in claim 19, wherein the FOUP is transmitted from the storage location of the first track to the second I/O port and is removed from the second I/O port using the transport system controller.

21. An automated material handling method, comprising:

assigning a first virtual stocker code to a first conveyer stocker controller, wherein the first conveyer stocker controller comprises at least a first input/output (I/O) port and a second I/O port and a first track connecting the first I/O port to the second I/O port, provides plural storage locations;

moving a front opening unified pod (FOUP) to and loading the FOUP in the first or second I/O port of the first conveyer stocker controller based on the first virtual stocker code using a transport system controller; and taking the FOUP away from the first or second I/O port of the first conveyer stocker controller using the transport system controller and moving the FOUP to and loading the FOUP in a second conveyer stocker controller, wherein the second conveyer stocker controller comprises a second virtual stocker code and provides at least a third I/O port and a second track connecting the third I/O port and the second track provides plural storage locations.

* * * * *